Jan. 29, 1935. W. L. MARYFIELD ET AL 1,989,484
BAIT CASTING PRACTICE DEVICE
Filed Oct. 10, 1930 2 Sheets-Sheet 1
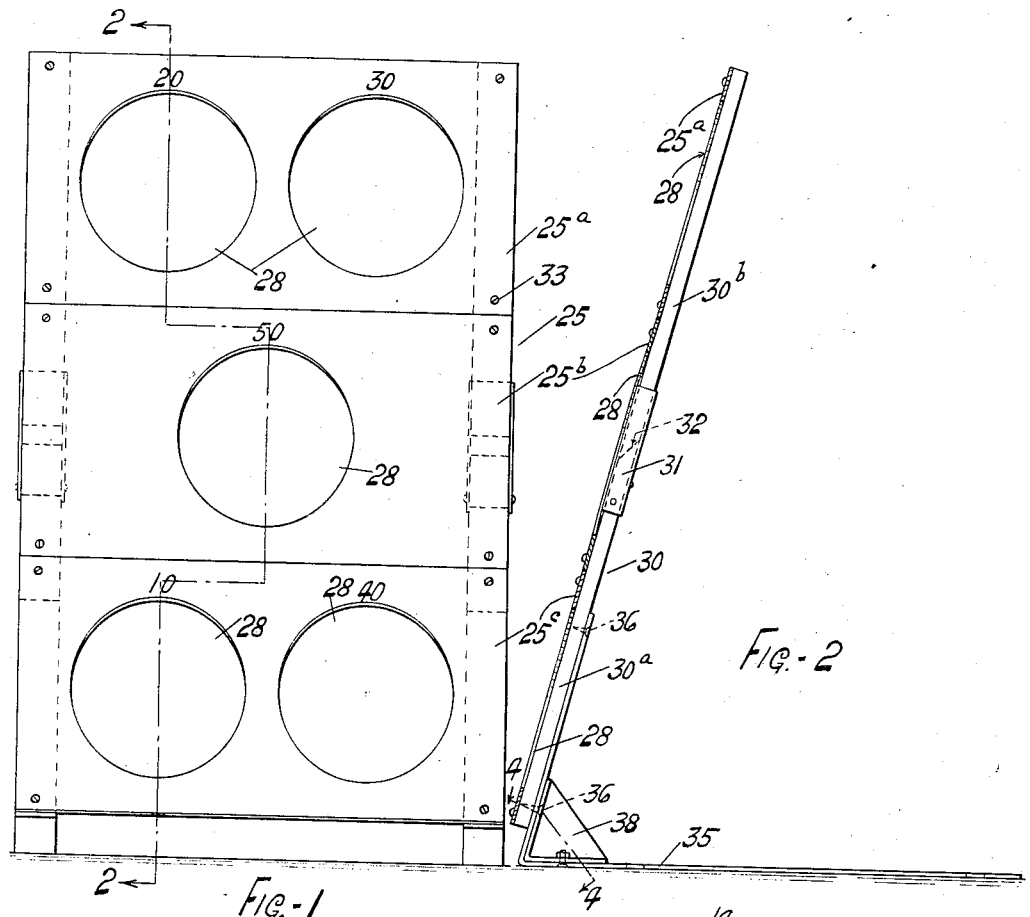
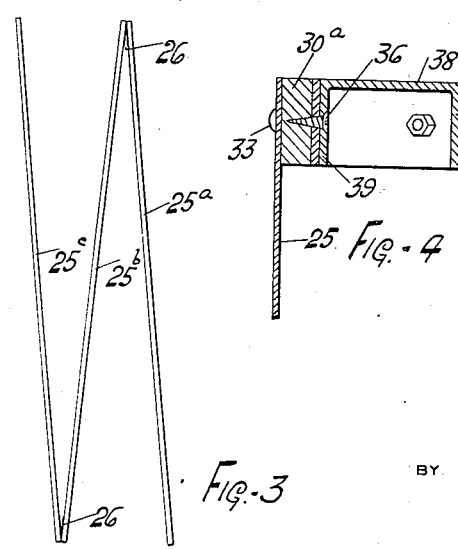
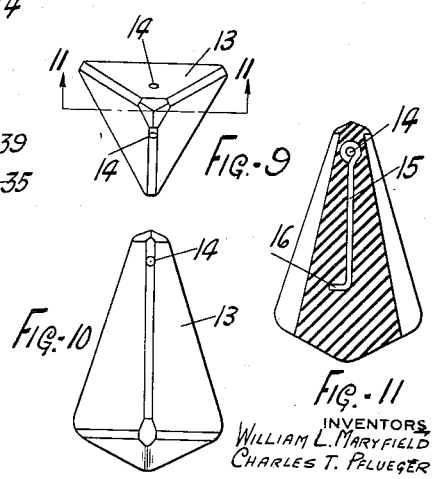
INVENTORS
WILLIAM L. MARYFIELD
CHARLES T. PFLUEGER
BY
ATTORNEYS

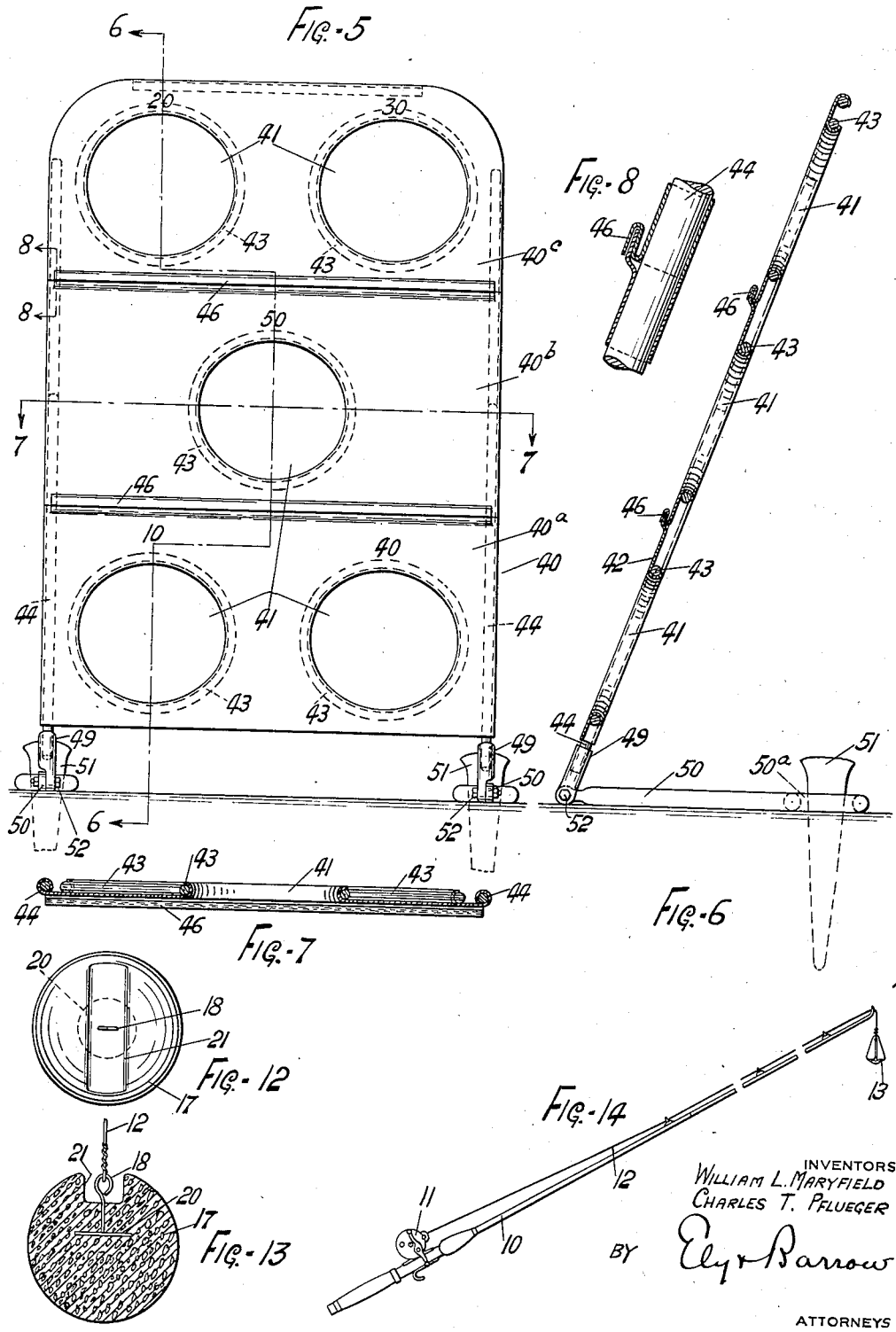

Patented Jan. 29, 1935

UNITED STATES PATENT OFFICE 1,989,484

BAIT CASTING PRACTICE DEVICE

William L. Maryfield, Elnora, Ind., and Charles T. Pflueger, Akron, Ohio, assignors to The Enterprise Manufacturing Company, Akron, Ohio, a corporation of Ohio Application October 10, 1930, Serial No. 490,661

1 Claim. (Cl. 273—102)

This invention relates to a bait casting game wherein an object fastened to the line of a bait casting outfit is cast at a suitable target board, after which it can be retrieved and cast again as often as desired.

It is an object of the invention to provide an entertaining diversion or game which can be enjoyed by the novice and expert bait caster alike and which will test and develop the skill of the bait caster.

The expert fisherman seeks to improve his accuracy in casting and it is one of the principal objects of the invention to afford an entertaining and novel form of sport which can be used by the fisherman in perfecting his skill in that art. The invention comprises the combination of a target board with a suitable weighted object attached to a line by which casting can be practised at any convenient location, and to afford a ready means of providing a game for the purposes set forth.

The above and other objects of the invention are achieved by the apparatus illustrated in the accompanying drawings and described below, it being understood that the invention is not limited to the exact form thereof shown and described.

In the drawings:

Figure 1 is a front elevation of a simple form of target board embodying the invention;

Figure 2 is a vertical section of the target board on the line 2—2 of Figure 1;

Figure 3 is an edge view showing the board in folded condition for shipping or storage;

Figure 4 is an enlarged sectional detail taken on the line 4—4 of Figure 2;

Figure 5 is a front view of a second form of target board which has features of refinement over the simple form;

Figure 6 is a vertical section on the line 6—6 of Figure 5;

Figure 7 is a horizontal section on the line 7—7 of Figure 5;

Figure 8 is an enlarged detail on the line 8—8 of Figure 5;

Figure 9 is a plan view of the object used in the casting game, which is the substitute for the bait or sinker used in bait casting;

Figure 10 is a side view thereof;

Figure 11 is a sectional view of the object taken on line 11—11 of Figure 9;

Figure 12 is a plan view of a modified form of object;

Figure 13 is a section of the object of Figure 12; and

Figure 14 is a side elevation of a bait casting outfit with the object attached to the line thereof.

The numeral 10 indicates a casting rod having the reel 11 thereon and the line 12 extending along the rod and carrying the object or body 13.

The preferred form of object is illustrated in Figures 9 to 11 inclusive and is made of a block of rubber in the general form of a three-sided pyramid. The apex of the pyramid is provided with an aperture 14 to which the line is attached, an eye member 15 being embedded in the rubber to reinforce the line receiving aperture. The reinforcement may be provided with a hook 16 to secure a more effective embedding of the eye member in the object. The solid vulcanized rubber body provides an object which is easily cast and which will not injure the target or any object which may be struck. The object is preferably white so as to be easily seen during casting so that its path may be followed, and as the rubber is white throughout, it will retain its color for the life of the object. The pyramid shaped body will prevent rolling of the object which would entangle or twist the line and its pointed end is easily withdrawn from the target or around an object which may be caught within the line. In weight the body is comparable to any of the usual or standard casting weights.

Figures 12 and 13 show a modified form of object which is a small sponge rubber ball 17, to which is attached an eye 18 anchored within the ball by the plate 20. The eye is located within the transverse recess 21 and is wholly within the surface of the object. It will be noted that in both forms of the object, the eye is located within the bounds of the body and does not project so that it will strike and injure the target or any other article which it may strike.

With either form of body, the method of use is the same, the body being cast in the usual manner employed in all bait casting.

The simplest and more inexpensive form of target board is illustrated in Figures 1 to 4 inclusive, being in the form of a paneled board of heavy cardboard, wood, ply wood, or similar material. The board is indicated, as a whole, by the numeral 25, in the form shown being composed of three panels, 25ª, 25ᵇ and 25ᶜ, connected together by flexible strips or hinges 26 placed reversely at the lines of jointure of the panels so that the board may be folded in the manner shown in Figure 3 for convenience in shipping or storage.

In each of the panels are located targets, preferably in the form of openings or pockets 28, through which the body is cast and which constitute the goals to which the object is directed. The edges of the board and about the pockets may be rounded, if desired, for preventing cutting of the line. For the purpose of making a game, the several holes may be labeled with numerals indicating different values so that scores may be kept and when more than one player is using the device, the scoring adds a contest to the game which makes it more attractive. The location, number, sizes and values of the openings may be varied at the discretion of the manufacturer.

The target board is arranged at a convenient angle for casting and at certain distances from the position taken by the caster, the distance being determined by the skill of the persons using the device. For this purpose the board is attached to two uprights 30 and, for convenience, these uprights may be made in two or more sections 30a and 30b, one of the sections being provided with a socket member 31 projecting from the end thereof and providing a means for connecting the sections. These sections may be formed on a miter 32 for security. When the uprights are assembled, the board is attached by means of screws or any other attaching means 33.

A stand 35 is provided at each side of the target which may be made of a piece of strap iron or steel with a horizontal base portion and an angularly arranged extension to which the uprights 30 are secured by screws 36. Holes may be formed in the base portion by which the stand may be fixed in the ground or on a floor. At the angular portion of the stand is provided a brace 38 which may be in the form of a triangular plate having flanges 39 secured to the two arms of the stand. This brace also prevents the line being caught in the angle of the stand.

A modified form of target or board 40 is shown in Figures 5 to 8 inclusive and is preferably built up of a plurality of separable sections 40a, 40b and 40c, each of which is formed with one or more openings or pockets 41 which may be marked with different numbers or values as in the preferred form. The target sections are preferably formed of sheet metal panels 42 which are reinforced with bars or wire 43 around the pockets 41. Along the edges of the sections, the metal of the panels is bent or folded to provide channels for vertical rods 44. In assembling, the several panels are aligned and the rods 44 inserted in the channels, the rods being shown in two sections for convenience in packing and arranged with the joints midway of one of the panels. As shown in Figure 8, the edges of the sheet metal of the adjoining sections may be provided with mating tongue and groove formations as at 46 to engage with the adjacent section to make a neater and stronger board and to insure proper assembly thereof.

The rods 44 of the lower target section 40a are received in sockets 49 in a pair of supports 50 which rest on a supporting surface such as the earth or floor. To secure the target in position, the supports may be formed with eyes 50a through which stakes 51 may be driven into the earth or into a floor. In order to provide for varying the inclination at which the target board may be set, the sockets 49 may be separate from the supports 50 and may be connected thereto by bolts 52 about which the sockets may be adjusted.

Rough or protruding edges or projections must be avoided in the construction of the target to prevent the line 12, attached to the bait, from being snagged or cut in using the target, and for this purpose the upper corners of the target are rounded. The rounding edges of the panels and about the openings assist in this result.

When playing the game, the target board, which may be conveniently and portably carried in the collapsed condition, is set up and placed in an open space or room which will permit the use of a casting rod. The players now may determine the distance from which they will cast at the target which will be closer for the inexperienced than for the more expert. The bait members will be attached to the casting outfits of the various players and the game begun. The players will cast in turn at the target, attempting to cast the bait member through the openings therein. After each cast the bait member is retrieved by the player from his place by reeling up his line. The openings in the target may each be numbered so that the score of the respective players may be kept. A multiplicity of ways to play the game and to score may be readily devised. In addition to affording a new and novel form of entertainment, the continued practice in the game will improve accuracy of casting and will be of benefit to the fisherman who plays the game.

The size, shape and location of the openings in the target board may be widely varied as can be exact form and construction thereof. The shape, size, weight and composition of the bait members may also be changed as desired.

As many other changes could be made in the construction, it is intended that all matter contained in the above description or shown in the accompanying drawings shall be interpreted as illustrative only and not in a limiting sense. Accordingly, various modifications and applications of the invention can be resorted to without departing from the spirit of the invention or the scope of the appended claim.

What is claimed is:

In a bait casting game, a target board adapted to be placed in a position facing the caster and at a suitable distance therefrom, said board having one or more transverse openings therein, the axis thereof extending in the general direction of the caster whereby the latter may by the use of a rod, reel, line and pliable projectile make casts of the latter at will toward said target board and through said openings, the peripheral edges of the board around said opening being rounded to prevent chafing of or injury to the line in the event the projectile passes through the opening and in retrieving the projectile therefrom from the remote position of the caster; and means at the base of the target board by which the latter may be supported in the proper position with respect to the caster.

WILLIAM L. MARYFIELD.
CHARLES T. PFLUEGER.